United States Patent [19]

Bernard

[11] Patent Number: 5,088,496
[45] Date of Patent: Feb. 18, 1992

[54] ULTRASONIC ECHOGRAPHY APPARATUS UTILIZING A DIGITAL DEVICE FOR FORMING CHANNELS, IN THE RECEIVING MODE

[75] Inventor: Xavier Bernard, Marolles-en-Brie, France

[73] Assignee: U.S. Philips Corporation, New York, N.Y.

[21] Appl. No.: 590,398

[22] Filed: Sep. 28, 1990

[30] Foreign Application Priority Data

Sep. 29, 1989 [FR] France ................. 89 12762

[51] Int. Cl.⁵ .............................................. A61B 8/00
[52] U.S. Cl. .......................... 128/660.07; 128/661.01; 73/625
[58] Field of Search ........... 128/660.01, 660.07, 128/661.01; 73/625, 626; 367/103

[56] References Cited

U.S. PATENT DOCUMENTS

| | | | |
|---|---|---|---|
| 4,543,829 | 10/1985 | Lerch | 73/626 |
| 4,700,573 | 10/1987 | Savord | 73/625 |
| 4,779,242 | 10/1988 | Lannuzel | 73/626 X |
| 4,787,392 | 11/1988 | Saugeon | 128/661.01 |
| 4,920,521 | 4/1990 | Yoshie | 73/626 X |
| 4,974,211 | 11/1990 | Corl | 73/626 X |

OTHER PUBLICATIONS

R. G. Pridham et al., "A Novel Approach to Digital Beamforming", Journal Acoust. Soc. Am., vol. 63, No. 2, Feb. 1978, pp. 425-434.

Primary Examiner—Francis Jaworski
Attorney, Agent, or Firm—William Squire

[57] ABSTRACT

An ultrasonic echography apparatus, comprising a device for forming M channels which comprises, for each channel an analog-to-digital converter a delay line for introducing a delay with a step of $1/f_e$, and a circuit for interpolation and selection from N samples for each input sample, which circuit is formed by:

N parallel processing chains $(j=1, \ldots, N)$, $N-1$ of the chains comprising a respective digital filter for interpolation with a shift $j/Nf_e$ with respect to the non-interpolated signal of the $N^{th}$ chain, the $N^{th}$ chain comprising a compensation delay line to compensate for the delay introduced by the interpolation filter, and a multiplexer ($422_j$) for the N parallel chains.

25 Claims, 3 Drawing Sheets

ULTRASONIC ECHOGRAPHY APPARATUS UTILIZING A DIGITAL DEVICE FOR FORMING CHANNELS, IN THE RECEIVING MODE

BACKGROUND OF THE INVENTION

1. Field of the Invention

The invention relates to an ultrasonic echography apparatus, comprising a piezoelectric transducer which is composed of M elementary transducers which operate at the central frequency $f_c$ and are connected to an electronic scanning device, a stage for transmitting an ultrasonic beam, and a stage for receiving and processing echographic signals returned to each elementary transducer, said receiving and processing stage comprising a device for forming M channels which comprises, for each channel, an analog-to-digital converter which operates at the sampling frequency $f_e$.

The invention can be used particularly attractively in the field of medical echography, notably for the formation of images of organs.

2. Description of the Prior Art

The receiving and processing stage of echography apparatus of the kind set forth serves to realize the function which is known as the formation of channels. This operation consists in the focusing of the ultrasonic beam during reception; practically speaking, this is the summing in phase of the M echos received by the M elementary transducers and originating from the same scanning point. Because the various elementary transducers are not situated at the same distance from the focal point, the channel-forming device essentially comprises delay lines which enable compensation for these differences in distance and also enable all echos to be brought in phase for summing.

Echographic scanning takes place in several directions, all directions extending in a plane which extends through the M elementary transducers which are generally arranged in a row in the form of an array which may be either a linear array or a phase array. In the former case, the various scanning directions extend parallel to one another in the scanning plane, and in the case of the phase array these directions imply sectorial scanning. In the two cases, scanning takes place by focusing on several points, proceeding from the nearest to the furthest point for a given direction, followed by the step-wise change-over to a next, adjacent direction. In order to avoid unnecessary complexity of the description, it will limited to the focusing on several points of a given scanning direction. It is also to be noted that in the two cases (linear array and phase array), the receiving stage operates with one channel for each elementary transducer, so M channels for M transducers.

These channels are generally formed in a conventional way by analog processing, each channel being formed by a group of delay lines which can be switched in order to obtain a correct phase for each focal point of a given scanning direction. The signals delayed by different delays are subsequently summed. Some focal points can thus be obtained for each direction, say from 15 to 20 points. With each of these points there is associated a small sharp field (the equivalent of a field depth in optics), enabling the reconstruction of the signal, subsequent to the channel-forming device for the formation of images of organs. The precision obtained using this analog approach, however, may be considered to be insufficient and when a larger number of points is desired per scanning direction, it is very advantageous to utilize a digital channelforming device in which each channel comprises an analog/digital converter which is connected to its input and whose sampling frequency is referred to as $f_e$.

The frequency $f_e$ must satisfy the Nyquist criterion and, moreover, in order to obtain a high focusing precision, it is advantageous when the sampling interval (the period) is as small as possible, necessitating the possibility of operation at a very high sampling frequency $f_e$. However, the cost of fast components is such that it is not feasible to increase the frequency $f_e$ very substantially, the more so because the number of components used in analog channel-forming architectures is already very large. A first approach in realising a digital channel-forming device consists in the direct transposition of the analog device by providing each channel with a variable digital delay device such as a shift register or a FIFO memory which is controlled by a programmed memory in order to obtain delays in steps which are variable from one channel to another at a given instant and which are also variable within a given channel) from one instant to another.

The value of these delays whose elementary step is equal to the sampling period $1/f_e$ will be described hereinafter.

When the desired elementary delay step is smaller than $1/f_e$, there is a technical problem in that the output signal of each channel must be enhanced. This technical problem is solved, for example as described in the publication: Journal of the Acoustical Society of America, Vol. 63, No. 2, February 1978, New York, USA, pp. 425-434. The structure of the channel-forming device described in the cited publication remains substantially the same as that of the transposed analog structure, i.e. there is only one digital delay device for each channel. However, in one particular structure an interpolation filter is inserted in each channel to enable enhancement of the output signal of each channel, be it at the expense of a change of frequency between the input and the output of the channel-forming device.

SUMMARY OF THE INVENTION

The invention aims to solve the above technical problem in a different way in order to enhance the output signal of each channel even more.

It is an object of the invention to realise a digital channel-forming device utilizing interpolation devices in which all elements are controlled at the sampling frequency $1/f_e$.

It is another object of the invention to realise a digital channel-forming device utilizing N interpolation filters per channel in parallel, N being the ratio of the sampling period $1/f_e$ and the desired elementary delay step $1/Nf_e$.

It is another object of the invention to enable, during each sampling period, a selection of the point, interpolated or not on the basis of the input samples of each channel, which approaches the desired elementary delay step as closely as possible.

These objects are achieved in that the receiving and processing stage of the ultrasonic echography apparatus described above is characterized in that it also comprises, for each channel, digital delay means with a delay step of $1/f_e$, and a circuit for interpolation and selection from N samples for each input sample, which circuit is formed by:

N parallel processing chains (j=1, ..., N), N-1 of the chains comprising a respective digital interpolation filter which supplies samples which have been shifted by $j/Nf_e$ with respect to the noninterpolated signal of the $N^{th}$ chain, the latter chain comprising a fixed-delay line for compensating the delay introduced by the interpolation filter in order to obtain a fixed delay which is identical and a multiple of $1/f_e$ for all chains of a given channel during a given period $1/f_e$, and a multiplexer for the N parallel chains in order to select one of the N chains during each period $1/f_e$, the digital delay means being controlled so as to deliver, at the rate $f_e$, a delay equal to $k/f_e$, including the fixed compensation delay (k integer), the value of k being variable for the M channels for a given sampling period and also being variable, for each channel, from one sampling period to the next.

Thus, the delay introduced in each of the channels in the reception mode of the echography apparatus in accordance with the invention, being the same for all N chains, is subdivided into two parts: one fixed part which is formed by the compensation delay line or, which is the same, the delay of the interpolation filter in each chain, and a variable part which occurs downstream and which is controlled to the same value in each chain. The sum of these two delays equals a multiple k of $1/f_e$. It can be demonstrated that the delays to be introduced in each channel increase as the scanning progresses in a given direction, the rotation of the phase of the echographic signal then taking place at a rate slower than the sampling frequency $f_e$. In a channel simply transposed from analog to digital, at the output of each channel this would produce samples which cannot be samples other than the input samples, that is to say separated at least by the duration $1/f_e$, which would actually be the repetition of given samples at the output from time to time as will be explained in detail hereinafter. However, using the device in accordance with the invention with adequate control of the multiplexer of each channel, it becomes possible, to obtain upon each changeover of a step of the desired elementary delay (referred to as reduced step) to the next a sampling value on the output of the multiplexer which is only separated from the preceding sample by the value $1/Nf_e$, which enables each time different samples to be obtained on the output. The series of samples obtained on the output of the multiplexer thus better takes into account the signal of each channel than that which would be obtained in the absence of multiplexing.

Given embodiments in accordance with the invention aim to minimize the number of delay lines required for the channel-forming device.

Finally, for a given operating frequency $f_e$, the ultrasonic echography apparatus in accordance with the invention offers a choice from N samples per period $1/f_e$, enabling the use of lowfrequency components and hence a reduction of the cost of the apparatus, while at the same time the precision of focussing is improved. The cost of the echography apparatus is further reduced by the digital processing of the signals which is more advantageous than the known analog architectures which necessitate numerous control operations and long, intricate developments and which are more difficult to integrate than logic circuits. Moreover, the echography apparatus in accordance with the invention offers the important advantage that as it permits access to all delay points: the digital channel-forming device can be adapted to any type of probe. This possibility to select any delay at any instant also enables the use of greatly varying channel formations, notably "pursuit" focusing or "compound" images.

IN THE DRAWINGS

The invention will be described in detail hereinafter with reference to the accompanying drawings; therein:

DESCRIPTION OF THE PREFERRED EMBODIMENTS

Figure 1:
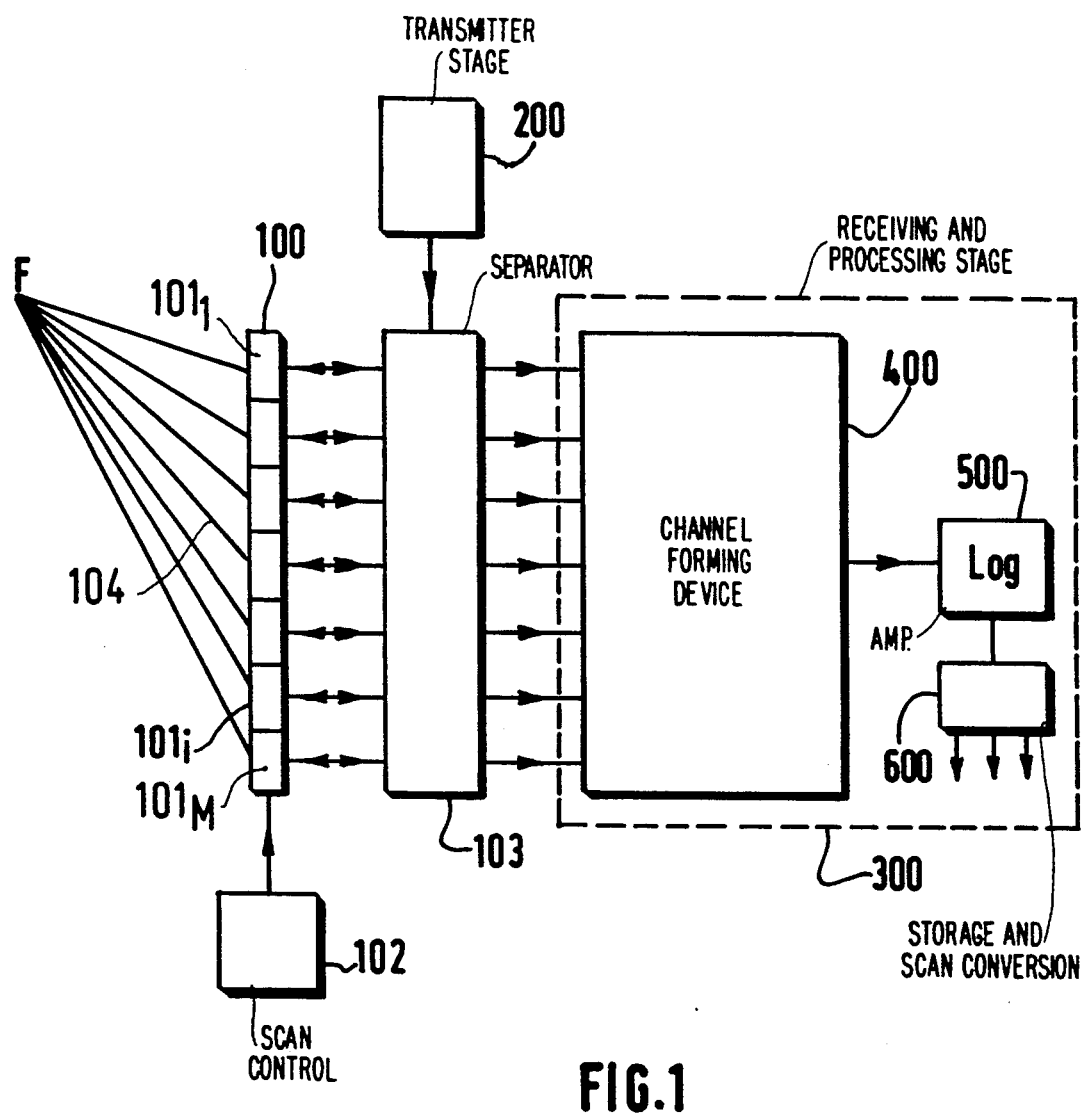
FIG. 1 shows the block diagram of an ultrasonic echography apparatus in accordance with an embodiment of the invention.

FIG. 1 shows the diagram of an ultrasonic echography apparatus, comprising a piezoelectric transducer 100 which consists of M elementary transducers $101_i$ (i=1, 2, ..., M) operating at the central frequency $f_c$ and which is connected to an electronic scan control device 102. A transmitter stage 200 forms an ultrasonic scanning beam and a stage 300 for receiving and processing echographic signals returned to each elementary transducer $101_i$ enables the formation of echographic images of the medium observed.

The transmitter stage 200 conventionally comprises a sequencer which is composed of an oscillator and a frequency divider which controls, at the selected recurrent frequency, a generator whose electric excitation signals are applied to the transducer 100 which converts these signals into periodic trains of ultrasonic pulse signals. A separator 103 for separating the transmitter stage 200 and the receiving and processing stage 300 is inserted between the transducer 100 and the stages 200, 300, thus preventing the overloading of the receiving circuits by the transmission signals.

The ultrasonic echography apparatus shown in FIG. 1 is an apparatus in which the transducer 100 comprises a phase array which scans, as shown in the Figure, in the angular dirctions 104 with which the focal point F is associated. Scanning continues in the same directions 104 according to focal points which are situated increasingly further from the phase array, than the point F.

The receiving and processing stage 300 comprises, connected to the output of the separator 103, a device 400 for forming channels, a logarithmic compression amplifier 500, and a storage and scan conversion device 600 which controls, for example a display device.

Figure 2:
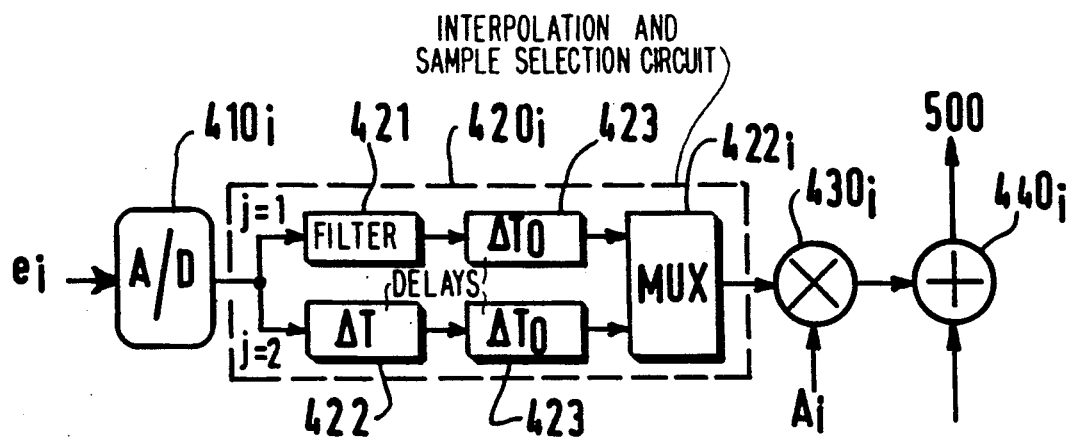
FIG. 2 shows the diagram of a channel-forming device of the echography apparatus shown in FIG. 1.

FIG. 2 shows a channel-forming device which comprises, for each channel i, an analog-to-digital converter $410_i$ which transforms the echo $e_i$ received by the $i^{th}$ elementary transducer into a digital signal after filtering and amplification. As appears from FIG. 2, the channel-forming device comprises a circuit $420_i$ for the interpolation and selection of samples, which circuit is in this case formed by N=2 parallel processing chains, one of which (j=1) comprises a digital interpolation filter 421 and a delay line 423 which produces a delay $\Delta To$ which is a multiple of the delay step $1/f_e$, the other chain (j=2) being formed by a delay line 422 which compensates for the delay $\Delta T$ introduced by the interpolation filter 421 in the chain j=1, and a delay line 423 which is identical to that of the chain j=1. The chain j =2 conventionally supplies a signal sampled at the frequency $f_e$ which can be delayed by $k/f_e$ ($k/f_e - \Delta T = \Delta To$), k being an integer, which is chosen as a function of the focusing desired during reception. The digital delay line 422 is not programmable and its value may differ from one channel to another.

Figure 3:
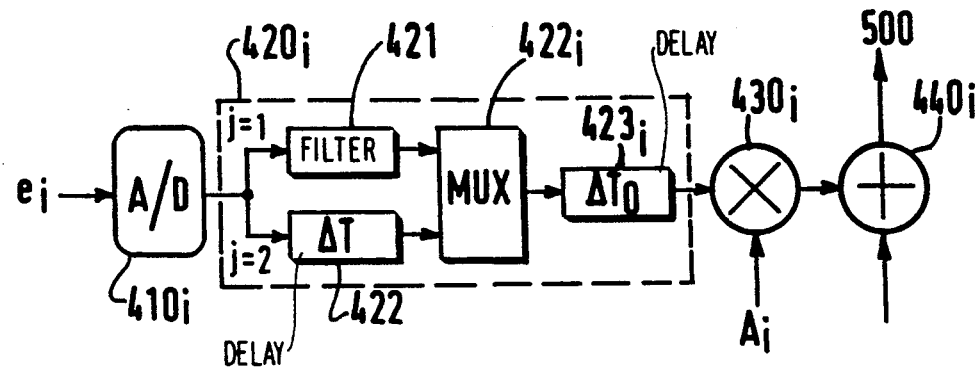
FIG. 3 shows the diagram of a first alternative version of the channel-forming device shown in FIG. 2.
Figure 4:
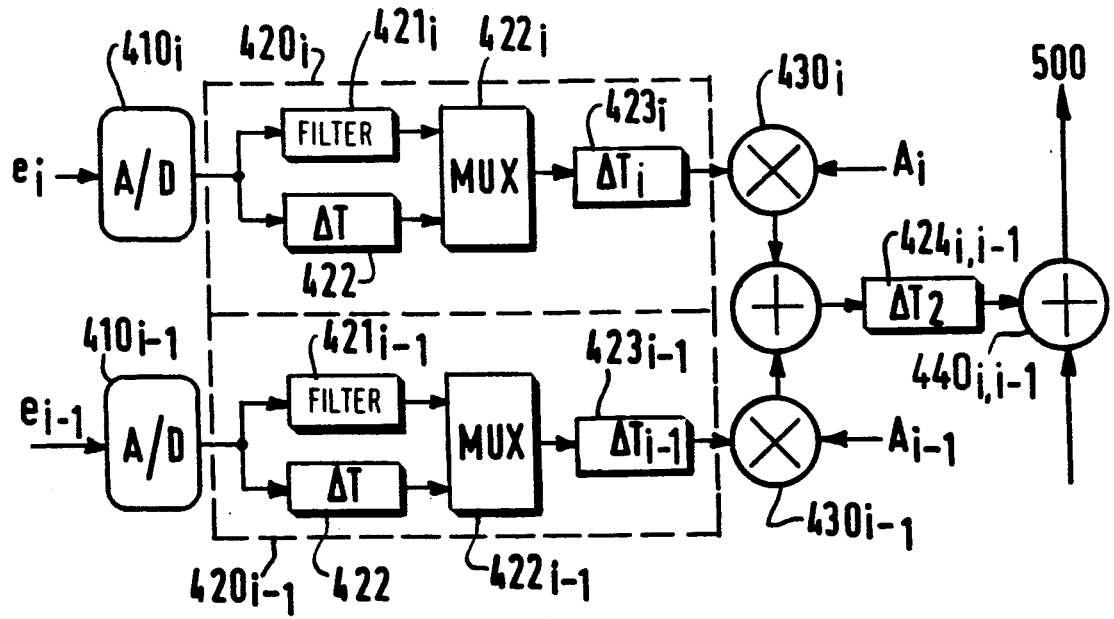
FIG. 4 shows the diagram of a second alternative version of the channel-forming device shown in FIG. 2.

However, the digital delay lines 423 of FIG. 2 and the other delay lines $423_i$ of FIG. 3 and $423_i$, $423_{i-1}$, $424_i$, $_{i-1}$ of FIG. 4 can all be controlled as they are formed by FIFO memories or shift registers. The variable delay values are multiples of $1/f_e$ so that they remain synchronized with the converter, all elements of the device operating at the clock frequency $1/f_e$ in a manner which is not shown for the sake of clarity of the drawings.

In the case of shift registers, a pointer which is addressed from a programmed memory containing the delay values necessary for each clock period $1/f_e$ selects, for each register, one of the outputs with a ratio of one possible output for each element of the register. For a given delay configuration whose delays differ from one channel to another there exists a focal point in the scanning direction 104. This is known from prior-art digital channel-forming devices and need not be shown or described in detail. The chain j=1 (FIG. 2) produces a series of samples which deviates from that produced by the chain j=2, also at the sampling frequency $f_e$, calculated by the interpolation filter 421 which is designed so as to ensure that this other series of samples is shifted one half sampling step $\frac{1}{2}f_e$ with respect to the direct samples of the chain j=2.

It is to be noted that, generally speaking, for N greater than 2, the N−1 interpolation devices are designed to supply, on two adjacent chains j and j+1, regardless of j, two series of samples which have been shifted by $1/Nf_e$ with respect to one another. Thus, on the output of the circuit $420_i$(FIG. 2) there are available two (or N) series of signals either direct or interpolated, which together represent a signal having the frequency $2/f_e$(or $Nf_e$). A multiplexer $422_i$ for the 2 (or N) parallel lines selects the signal, direct or interpolated, which is suitable for the delay desired for the channel i. The multiplexer operates at the frequency $f_e$ and the selection control signal is supplied, in the same way as the control signals for the variable delay lines, by a programmed memory at a rate of one memory per multiplexer (not shown). The focusing resolution is thus enhanced because in the known digital channel-forming device only delays can be realized which vary in steps of 1 of the sampling step, so $1/f_e$, $2/f_e$, $3/f_e$, ..., while the device described with reference to FIG. 2 also enables intermediate delays $1.5/f_e$, $2.5/f_e$, $3.5/f_e$ ... to be obtained. In the example shown in FIG. 1, N is equal to 2, but it is to be understood that higher values could be imparted to N, i.e. 3, 4, 5, ..., which actually means a multiplication of the focusing resolution by 3, 4, 5 ....

An example as given in the below table for N=2 offers a better understanding of how the focusing resolution can be achieved in accordance with the invention.

| direct sample | 0 | 1 | 2 | 3 | 4 | 5 | 6 | 7 | 8 | 9 |
|---|---|---|---|---|---|---|---|---|---|---|
| interpolated sample | — | 0.5 | 1.5 | 2.5 | 3.5 | 4.5 | 5.5 | 6.5 | 7.5 | 8.5 |
| reduced delay (λ/4) | 3 | 3 | 3 | 3 | 3 | 3.5 | 3.5 | 3.5 | 4 | 4 |
| output sample | — | — | — | 0 | 1 | 1.5 | 2.5 | 3.5 | 4 | 5 |

In the table the desired elementary delay step (reduced step) is expressed as a fraction of $\lambda/4$, where $\lambda$ is the wavelength of the signals originating from the elementary transducers, the reduced step corresponding actually to a difference in transit time of the echographic signals of $\lambda/8$ whereas the sampling period corresponds to the double value, or $\lambda/4$. It is also to be noted that the delay increases in the scanning direction as has already been indicated.

In accordance with the table it is considered that the desired delay is equal to $3\lambda/4$ at the sampling instant 0.

At the instant 3, the sample number 0 appears on the output of the delay line 423, after which the sample 1 appears at the instant 4. If the delay becomes 3.5 $\lambda/4$ at the instant 5, a choice can be made between the direct sample number 2 and the interpolated sample number 1.5 (sample interpolated between the samples 1 and 2). The multiplexer is then controlled so as to switch to the chain j=1 which comprises the interpolation device and supplies the sample 1.5 and subsequently, at the instant 6, the sample 2.5 and the sample 3.5 at the instant 7.

If the delay changes from 3.5 to 4 at the instant 8, the multiplexer is switched again to the direct chain so as to supply the direct sample, and utilizing an additional average increase equal to $1/f_e$ of the delay produced by the delay line 423. The sample subsequently supplied on the direct chain is the sample 5 at the instant 9.

In a digital channel-forming device which is a direct transposition of the analog device, it would however not be possible to take into account the reduced intermediate delays such as 3.5 $\lambda/4$ and the operation would be limited to the supply, for each intermediate reduced delay, of the same input sample for two consecutive clock beats $f_e$ on the output of the delay line of the channel considered.

In order to eliminate the "limbs" in the directivity curve of the piezoelectric transducer, an apodization operation is performed which is known per se and which consists of the weighting of the signals of each channel i by a coefficient $A_i$, relating to the elementary transducer $101_i$ considered, of a gaussian curve centered around the center of the piezoelectric transducer 100. This apodization is realised by the multiplier $430_i$. FIG. 2 the apodization multiplier could be formed simply by a number of shift registers, being at the most equal to the number of bits of the apodization coefficients, and an adder, without substantially affecting the efficiency of apodization.

After apodization, if any, all signals originating from each channel i thus rephased are added by adders $440_i$ and applied to the amplifier 500.

Figure 5:
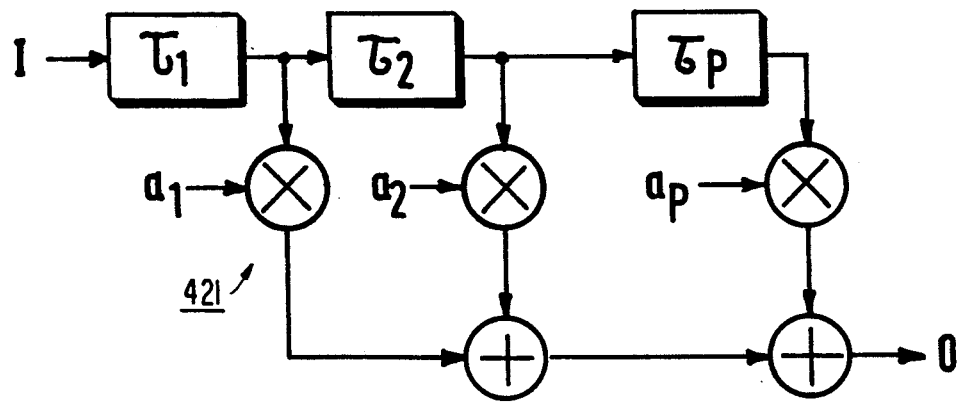
FIGS. 5 and 6 show the diagram of two digital interpolation filters suitable for use in the channel-forming devices shown in FIGS. 2 to 4.

FIG. 5 shows a first example of a digital interpolation filter 421 which can be used, preferably in the circuit $420_i$, for frequency multiplication. This filter is known as a FIR (Finite Impulse Response) filter. The input and the output of this filter are referred to as I and O, respectively, the filter comprising delay lines $\tau_i$, ..., $\tau_p$ as well as multipliers and adders. This type of filter offers the advantage that it is commercially available.

When given steps are taken to select a sampling frequency which is adequately higher than the passband of the ultrasonic echographic signal, it is possible to utilize filters which realise an interpolation which is better than the linear interpolation, because these filters have a very good performance. For example, the echographic signal has a central frequency $f_c = 7.5$ MHz, its passband extends up to 10.5 MHz and the sampling frequency $f_e = 30$ MHz. In these circumstances, usable interpolation filters are for example, filters of the type ZR33891, marketed by the United States company ZORAN, which operate at 30 MHz on 9 bits for the data and the coefficients and which integrates 8 cells. Only three chips are necessary for realising the interpolation filter. Moreover, it is easy to modify the value of the P coefficients by utilizing SRAM memories. Generally speaking, for a FIR filter the number and the estimation of the value of the coefficients can be obtained by using well-known, optimized algorithms.

Figure 6:
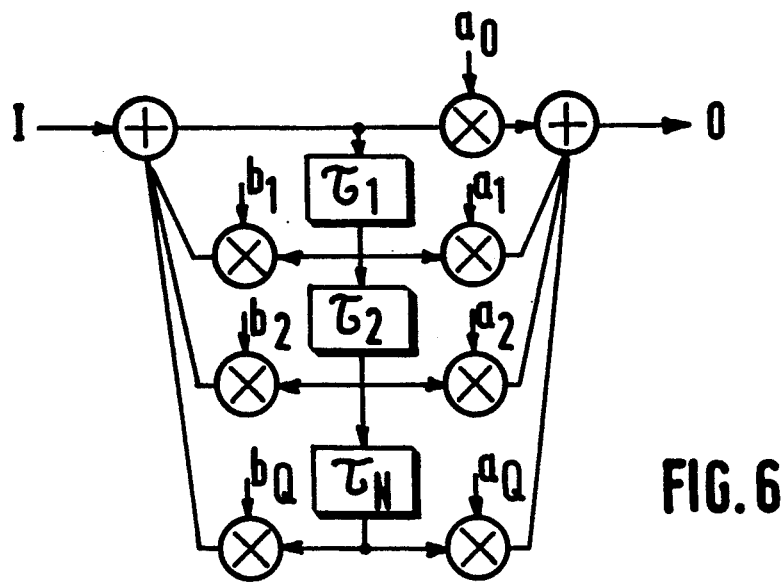

FIG. 6 shows another example of a digital interpolation filter. It concerns an IIR (Infinite Impulse Response) filter. This known filter requires fewer components than the FIR filter, but is more difficult to optimize and diverging filters, could occur.

It is to be noted that by choosing the sampling frequency $f_e$ to be equal to a multiple of the central operating frequency $f_c$ of the piezoelectric transducer (for example, $f_c = 10$ MHz and $f_e = 40$ MHz), the coefficients of the interpolation filters become fixed, regardless of the operating frequency $f_c$, thus enabling elimination of the multipliers of the filters, so that components are saved. Conversely, if the frequency $f_e$ were independent of $f_c$, it would be necessary to adapt the interpolation coefficients to the frequency $f_c$ and it would be necessary to maintain the multipliers.

In the embodiment shown in FIG. 2, the number of digital delay lines 423 equals j, their length being in the order of 500 elements. Therefore, it is desirable to reduce, if possible, the volume of these lines, which is the object of the alternative versions shown in the FIGS. 3 and 4.

FIG. 3 shows an alternative version of the device shown in FIG. 2 in which a single line $423_i$ for a delay $\Delta T_0$ is used and connected subsequent to the multiplexer $422_i$. This embodiment offers the advantage that the number of delay lines is divided at least by 2 (by N), so that the number of components used is reduced. However, in given cases an error can then occur in the delay applied, notably in the case of simultaneous variation of the values of the signals for controlling the delay line and the multiplexer; this affects the performance of the alternative versions shown in the FIGS. 3 and 4.

FIG. 4 shows another alternative version of the device shown in FIG. 2; this version serves to decrease the number of electronic components even further. It is based on the idea that, even in the case of large delays to be applied the delay between consecutive channels is small and only necessitates short (for example, in the order of 20 elements) and hence less intricate delay lines. FIG. 4 illustrates the example of two consecutive channels in a non-limitative fashion. The overall delay has been subdivided: first of all a small delay $\Delta T_i, i-1$ between the consecutive channels taken into account by means of a device identical to that shown in FIG. 3, and subsequently a second delay $\Delta T_i, \Delta T_{i-1}$ which is greater (of the same order as that applied by the lines $423_i$ and 423) which is introduced after the summing of the two channels i and i−1. The number of channels thus grouped may amount to 3, 4, 5 .... It is to be noted that the lines $423_i$, $423_{i-1}$ and $4424_i, i-1$ all receive a separate delay command.

The invention is not limited to what has been described above. The invention can also be used for echography apparatus comprising an annular transducer network instead of a linear array of transducers.

What is claimed is:

1. An ultrasonic echography apparatus, comprising a piezoelectric transducer composed of M elementary transducers which operate at a central frequency $f_c$ and are connected to an electronic scanning control device for controlling said transducers, a stage for causing the transducers to transmit an ultrasonic beam, and a stage for receiving and processing echographic signals returned to each elementary transducer, said receiving and processing stage comprising means for forming M channels and, for each channel (i), an analog-to-digital converter which operates at the sampling frequency $f_e$, digital delay means with a delay step of $1/f_e$, and means for interpolation and selection from N samples for each input sample, said latter means being formed by:

N parallel processing chains (j=1,..., N), N-1 of said chains comprising a respective digital interpolation filter which supplies samples which have been shifted by $j/Nf_e$ with respect to the non-interpolated signal of the $N^{th}$ chain, the latter chain comprising a fixed delay line for compensating the delay introduced by said interpolation filter in order to obtain a fixed delay which is identical and a multiple of $1/f_e$ for all chains of a given channel during a given period $1/f_e$, and a multiplexer for said N parallel chains in order to select one of the N chains during each period $1/f_e$, said digital delay means for delivering at the rate $f_e$, a delay equal to $k/f_e$, including said fixed compensation delay (k integer), the value of k being variable, for each channel, from one sampling period to the next.

2. An ultrasonic echography apparatus as claimed in claim 1, wherein said delay means are formed by a identical delay lines which are provided for each of the N parallel chains for each channel.

3. An ultrasonic echography apparatus as claimed in claim 2 wherein the sampling frequency $f_e$ is a multiple of the central operating frequency $f_c$ of the piezoelectric transducer.

4. An ultrasonic echography apparatus as claimed in claim 2 wherein each channel comprises an apodization multiplier connected to its output.

5. An ultrasonic echography apparatus as claimed in claim 2 wherein said digital interpolation filter is an F.I.R. filter.

6. An ultrasonic echography apparatus as claimed in claim 1 wherein said delay means are formed by a single delay line connected subsequent to the multiplexer.

7. An ultrasonic echography apparatus as claimed in claim 6 wherein the sampling frequency $f_e$ is a multiple of the central operating frequency $f_c$ of the piezoelectric transducer.

8. An ultrasonic echography apparatus as claimed in claim 6 wherein each channel comprises an apodization multiplier connected to its output.

9. An ultrasonic echography apparatus as claimed in claim 1 wherein said delay means are formed by a delay line with a relatively small delay which is connected subsequent to the multiplexer and, via an adder, by a line having a relatively long delay the latter delay being applied to the signal resulting from the summing of the signals supplied by at least two conjugate consecutive channels.

10. An ultrasonic echography apparatus as claimed in claim 9 wherein the sampling frequency $f_e$ is a multiple of the central operating frequency $f_c$ of the piezoelectric transducer.

11. An ultrasonic echography apparatus as claimed in claim 10 wherein each channel comprises an apodization multiplier connected to its output.

12. An ultrasonic echography apparatus as claimed in claim 11 wherein said apodization multiplier is formed by a number of shift registers, at the most equal to the number of bits of the apodization coefficients, and by an adder.

13. An ultrasonic echography apparatus as claimed in claim 12 wherein said digital interpolation filter is ian F.I.R. filter.

14. An ultrasonic echography apparatus as claimed in claim 9 wherein each channel comprises an apodization multiplier connected to its output.

15. An ultrasonic echography apparatus as claimed in claim 1 wherein the sampling frequency $f_e$ is a multiple of the central operating frequency $f_c$ of the piezoelectric transducer.

16. An ultrasonic echography apparatus as claimed in claim 15 wherein each channel comprises an apodization multiplier connected to its output.

17. An ultrasonic echography apparatus as claimed in claim 1 wherein each channel comprises an apodization multiplier connected to its output.

18. An ultrasonic echography apparatus as claimed in claim 17 wherein said apodization multiplier is formed by a number of shift registers, at the most equal to the number of bits of the apodization coefficients, and by an adder.

19. An ultrasonic echography apparatus as claimed in claim 1 wherein said digital interpolation filter is an F.I.R. filter.

20. An ultrasonic echography apparatus comprising:
    transducer means including M elementary transducers;
    means for causing said transducers to transmit an ultrasonic beam; and
    means for receiving and processing echographic signals returned to each of said transducers and comprising:
    means for forming M channels for receiving said returned signals including for each channel an analog-to-digital converter having a sampling frequency $f_e$ for producing an output signal; and
    interpolation and selection means for each said channel including delay means responsive to the output signal of said analog-to-digital converter for obtaining from the samples from said converter a sampling value separated from the preceding sample by a given value;
    said interpolation and selection means including first and second output signal processing chains, said second chain for producing output signal delays whose values are $k/f_e$ where k is an integer, said first chain for producing output signal delays whose values are $nk/f_e$ where n is less than one, and means for selectively combining said first and second delayed signals.

21. The apparatus of claim 20 wherein k is a plurality of values in which adjacent values differ in magnitude by one and n has the value of 0.5.

22. The apparatus of claim 20 wherein said first chain includes means for filtering said output signal while introducing a delay $\Delta T$ into said filtered signal and first controllable delay means having a controllable delay value $\Delta T_0$ fir delaying said filtered signal, said second output signal processing chain being parallel to the first chain and including fixed delay means for compensating for said filter delay $\Delta T$ and a second controllable delay means for delaying said fixed delay signal by said delay value $\Delta T_0$.

23. The apparatus of claim 22 wherein said first and second controllable delay means includes means for producing said $k/f_e$ delay.

24. The apparatus of claim 22 wherein the returned signals correspond to a given focus, said second signal processing chain fixed delay having said delay value $k/f_e$ where the value of k is a function of said given focus.

25. The apparatus of claim 24 wherein the value of said fixed delay differs from one channel to another.

* * * * *